US012190798B1

(12) United States Patent
Cui

(10) Patent No.: US 12,190,798 B1
(45) Date of Patent: Jan. 7, 2025

(54) DISPLAY PANELS AND DRIVING METHODS THEREOF

(71) Applicant: Guangzhou China Star Optoelectronics Semiconductor Display Technology Co., LTd., Guangdong (CN)

(72) Inventor: Zhengbo Cui, Guangdong (CN)

(73) Assignee: Guangzhou China Star Optoelectronics Semiconductor Display Technology Co., LTd.

( * ) Notice: Subject to any disclaimer, the term of this patent is extended or adjusted under 35 U.S.C. 154(b) by 0 days.

(21) Appl. No.: 18/523,942

(22) Filed: Nov. 30, 2023

(30) Foreign Application Priority Data

Oct. 13, 2023 (CN) ........................ 202311332525.0

(51) Int. Cl.
*G09G 3/20* (2006.01)
*G09G 3/32* (2016.01)

(52) U.S. Cl.
CPC ....... *G09G 3/32* (2013.01); *G09G 2300/0426* (2013.01); *G09G 2300/0842* (2013.01); *G09G 2320/0633* (2013.01)

(58) Field of Classification Search
CPC ............. G09G 3/32; G09G 2300/0426; G09G 2300/0842; G09G 2320/0633
USPC ........................................... 345/55, 211, 212
See application file for complete search history.

(56) References Cited

U.S. PATENT DOCUMENTS

| | | | | |
|---|---|---|---|---|
| 2021/0225261 | A1* | 7/2021 | Xuan | G09G 3/32 |
| 2022/0215799 | A1* | 7/2022 | Wang | H10K 59/131 |
| 2023/0071094 | A1* | 3/2023 | Son | G09G 3/2096 |
| 2023/0154414 | A1* | 5/2023 | Liu | G09G 3/3283 345/212 |
| 2023/0186850 | A1* | 6/2023 | Wang | G09G 3/3266 345/211 |
| 2023/0419903 | A1* | 12/2023 | Wang | H10K 59/131 |
| 2024/0046863 | A1* | 2/2024 | Sun | G09G 3/32 |
| 2024/0184390 | A1* | 6/2024 | Bok | H04N 23/57 |
| 2024/0257728 | A1* | 8/2024 | Han | G09G 3/32 |

* cited by examiner

*Primary Examiner* — Thuy N Pardo
(74) *Attorney, Agent, or Firm* — PV IP PC; Wei Te Chung

(57) ABSTRACT

Display panels and driving methods thereof are provided. The driving method includes: obtaining to-be-displayed grayscales of a frame of to-be-displayed image, where the frame of to-be-displayed image includes at least one first subframe and at least one second subframe; determining a target driving mode of each pixel driving circuit according to the to-be-displayed grayscales, where the target driving mode includes a first driving mode and a second driving mode; and when the target driving mode is the first driving mode, adjusting a time interval between an effective level of a first scanning signal and an effective level of a second scanning signal in the second subframe, so as to control a conduction duration of a light-emitting loop, where the first scanning signal includes at least one effective level in both the first and second subframes, and the second scanning signal includes the effective level between the first and second subframes.

12 Claims, 4 Drawing Sheets

DISPLAY PANELS AND DRIVING METHODS THEREOF

CROSS-REFERENCE TO RELATED APPLICATION

This application claims priority to Chinese Patent Application No. 202311332525.0, filed on Oct. 13, 2023, the disclosure of which is incorporated herein by reference in its entirety.

TECHNICAL FIELD

The present disclosure relates to the field of display technologies, and in particular, to display panels and driving methods of a display panel.

BACKGROUND

Mini LED display devices, also known as "sub-millimeter light-emitting diode display devices", refer to display devices each composed of LEDs with a grain (chip) size of 50 microns to 200 microns, which is between a grain (chip) size of LEDs of Micro LED display devices and a grain (chip) size of LEDs of small-pitch display devices. Since Mini LED display screens have excellent performance in terms of energy consumption, color gamut, contrast, HDR, flexibility, lifespan, etc., and the process difficulty thereof is not as difficult as that of Micro LED display devices, so that Mini LED display devices becomes the leading products in the upgrade of liquid crystal display (LCD) devices with the reduction of costs. The Mini LED display devices include Mini LED direct display screens and Mini LED backlight display screens.

Current driving methods of a Mini LED direct display screen include a pulse width modulation (PWM) driving mode, a pulse amplitude modulation (PAM) driving mode, and a pulse hybrid modulation (PHM; PAM+PWM) driving mode. The PHM driving mode takes advantage of respective advantages of the PWM driving mode and the PAM driving mode and is now the main direction of glass-based direct display driving methods.

There are many PHM driving methods. Combined with a 4T1C driving circuit, on a condition that a 120 Hz frame rate is used and each frame frequency is divided into 12 subframes, a driving method of odd subframes driven in the PWM driving mode and even subframes driven in the PAM driving mode is a conventional method in which the subframes corresponding to the PAM and the PWM are driven separately. However, compared to a 3T1C driving circuit, the 4T1C driving circuit driven by the PHM driving method may reduce the brightness under the same current, thereby reducing the display brightness of the display panel.

SUMMARY

In view of above, display panels are provided in response to embodiments of the present disclosure. The display panel includes a plurality of pixel driving circuits. Each pixel driving circuit includes a light-emitting element, a driving transistor, a data writing transistor, and a reset transistor. The light-emitting element is connected between a first power supply line and a second power supply line to form a light-emitting loop. A source and a drain of the driving transistor are connected in series in the light-emitting loop, and the driving transistor is configured to control a driving current flowing through the light-emitting element. A gate of the data writing transistor is connected to a first scanning line, a first electrode of the data writing transistor is connected to a data line, a second electrode of the data writing transistor is connected to the gate of the driving transistor, and the data writing transistor is configured to write a data signal provided by the data line into the gate of the driving transistor in response to a first scanning signal provided by the first scanning line, so as to turn on the light-emitting loop. A gate of the reset transistor is connected to a second scanning line, a first electrode of the reset transistor is connected to a voltage line, a second electrode of the reset transistor is connected to the gate of the driving transistor, and the reset transistor is configured to reset a potential of the gate of the driving transistor in response to a second scanning signal provided by the second scanning line and a reset voltage provided by the voltage line, so as to turn off the light-emitting loop.

Driving methods of a display panel are also provided in response to embodiments of the present disclosure. The driving method is applied in the above display panel and includes: obtaining to-be-displayed grayscales of a frame of to-be-displayed image, where the frame of to-be-displayed image includes at least one first subframe and at least one second subframe; determining a target driving mode of each of the pixel driving circuits according to the to-be-displayed grayscales, where the target driving mode includes a first driving mode and a second driving mode; and when the target driving mode is the first driving mode, adjusting a time interval between an effective level of the first scanning signal and an effective level of the second scanning signal in the second subframe, so as to control a conduction duration of the light-emitting loop, where the first scanning signal includes at least one effective level in both the first subframe and the second subframe, and the second scanning signal includes the effective level between the first subframe and the second subframe.

Another driving method is also applied in the above display panel and includes: dividing the frame of to-be-displayed image into a plurality of subframes, where a period of each of the subframes is equal; driving odd-numbered subframes of the plurality of subframes by a pulse width modulation mode; and driving even-numbered subframes of the plurality of subframes by a pulse amplitude modulation mode.

BRIEF DESCRIPTION OF THE DRAWINGS

The technical solutions and other beneficial effects of the present disclosure will be apparent through a detailed description of the specific embodiments of the present disclosure in conjunction with the accompanying drawings.

DETAILED DESCRIPTION

The technical solutions in the embodiments of the present disclosure will be clearly and completely described below with reference to the accompanying drawings in the embodiments of the present disclosure. Obviously, the described embodiments are only some of the embodiments of the present disclosure, but not all of the embodiments. Based on the embodiments in the present disclosure, all other embodiments obtained by those skilled in the art without making creative efforts fall within the protection scope of the present disclosure.

In addition, the terms “first” and “second” are only used for descriptive purposes and cannot be understood as indicating or implying the relative importance or implicitly indicating the number of indicated technical features. Therefore, a feature defined as “first” and “second” may include one or more features explicitly or implicitly. In the description of the present disclosure, “plurality” means two or more, unless otherwise explicitly and specifically limited.

In order to facilitate the understanding of the present disclosure, relevant terms involved in the present disclosure are first explained.

Frame: according to the visual characteristics of the human eye, when a display device displays an image, it needs multiple frames of images per second for continuous playback to feel the continuity of the image playback, otherwise it will feel the flicker of the display device, where the frame refers to one of the continuous multiple display images, and a frame of display image is equivalent to a still image.

Subframe: one frame of image may be divided into multiple subframes as needed, and one subframe is equivalent to a subfield period; during one subfield period, pixel units may maintain light emission in a certain luminous duration, thereby displaying a brightness level/a grayscale corresponding to the luminous duration; the longer the luminous duration of the pixel units, the brighter the brightness of the corresponding display image, that is, the higher the grayscale of the corresponding display image; when the pixel units of the display device display the frame of image, multiple subframes are actually displayed continuously; luminous durations of the subframes maintaining light emission are superimposes, that is, the brightness corresponding to the multiple subframes are superimposed, and the corresponding brightness/grayscale is finally formed in human vision, and this brightness/grayscale is the brightness/grayscale corresponding to the frame of frame of to-be-displayed image.

Grayscale: the grayscale represents different brightness levels from darkest to brightest; pixel circuits with different bits may display different numbers of grayscales. For example, an 8-bit pixel circuit is divided into 2^8=256 grayscales to display from darkest to brightest.

Figure 1:
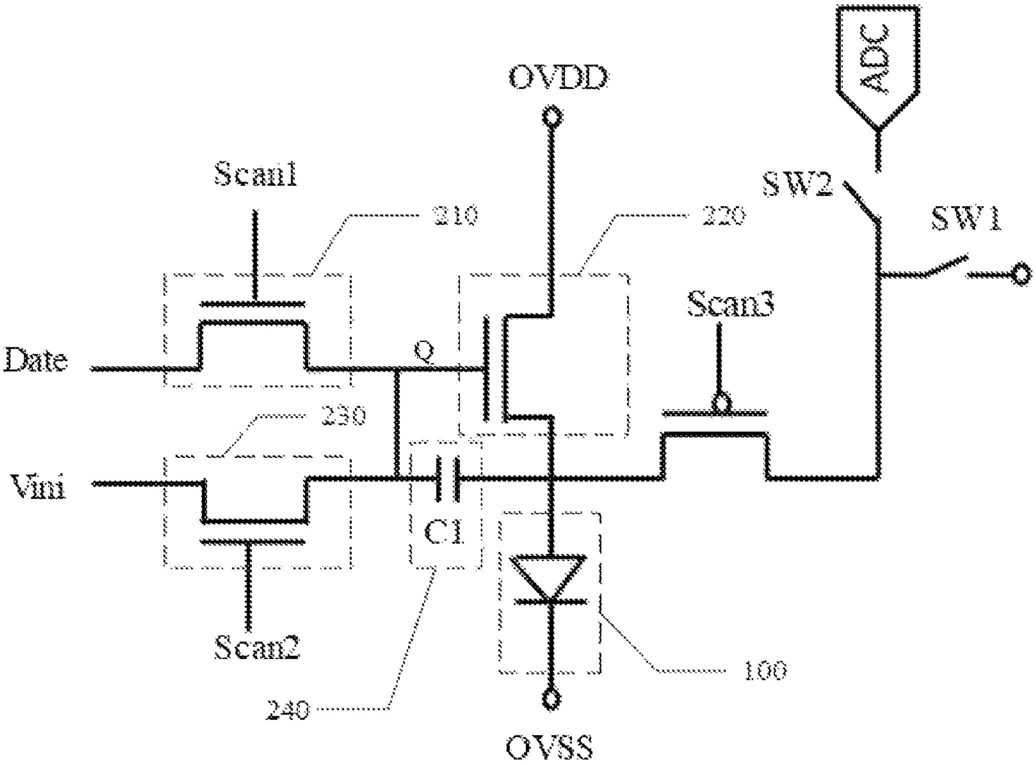
FIG. 1 is a circuit diagram of a pixel driving circuit of a display panel in response to embodiments of the present disclosure.

Referring to FIG. 1, embodiments of the present disclosure provide a display panel, which includes pixel driving circuits. Each pixel driving circuit includes a light-emitting element 100, a data writing transistor 210, a driving transistor 220, and at least one of a reset transistor 230 and a storage capacitor 240. A gate of the data writing transistor 210 is connected to a first scanning line. One of a source and a drain of the data writing transistor 210 (defined as a first electrode of the data writing transistor 210) is connected to a data line, and the other one of the source and the drain of the data writing transistor 210 (defined as a second electrode of the data writing transistor 210) is connected to a gate of the driving transistor 220. A gate of the reset transistor 230 is connected to a second scanning line. One of a source and a drain of the reset transistor 230 (defined as a first electrode of the reset transistor 230) is connected to a voltage line, and the other one of the source and the drain of the reset transistor 230 (defined as a second electrode of the reset transistor 230) is connected to the gate of the driving transistor 220. The light-emitting element 100 is connected between a first power supply line and a second power supply line to form a light-emitting loop, and a source and a drain of the driving transistor 220 are connected in series in the light-emitting loop. One end of the storage capacitor 240 is connected to the gate of the driving transistor 220, and the other end of the storage capacitor 240 is connected to the source or the drain of the driving transistor 220.

In specific implementation, the data writing transistor 210 is configured to write a data signal into the driving transistor 220 in response to a first scanning signal, and the reset transistor 230 is configured to reset a potential of a control terminal Q of the driving transistor 220 in response to a second scanning signal. The driving transistor 220 is configured to control a driving current flowing through the light-emitting element 100. The storage capacitor 240 is configured to store the written data signal and the second scanning signal. The data line is configured to provide the data signal Data, the first scanning line is configured to provide the first scanning signal Scan1, and the second scanning line is configured to provide the second scanning signal Scan2. The first power supply line is configured to provide a power signal OVDD, and the second power supply line is configured to provide a power signal OVSS. The voltage line is configured to provide a reset voltage Vini.

In the pixel driving circuit in the embodiments, when the data writing transistor 210 turns on in response to the first scanning signal, the data signal of the data line is written into the control terminal Q of the driving transistor 220 to control the driving transistor 220 to turn on, thus the light-emitting element 100 lights up. When the reset transistor 230 turns on in response to the second scanning signal, the control terminal Q of the driving transistor 220 is reset by the reset voltage and the driving transistor 220 turns off, thus the light-emitting element 100 stops lighting.

Figure 2:
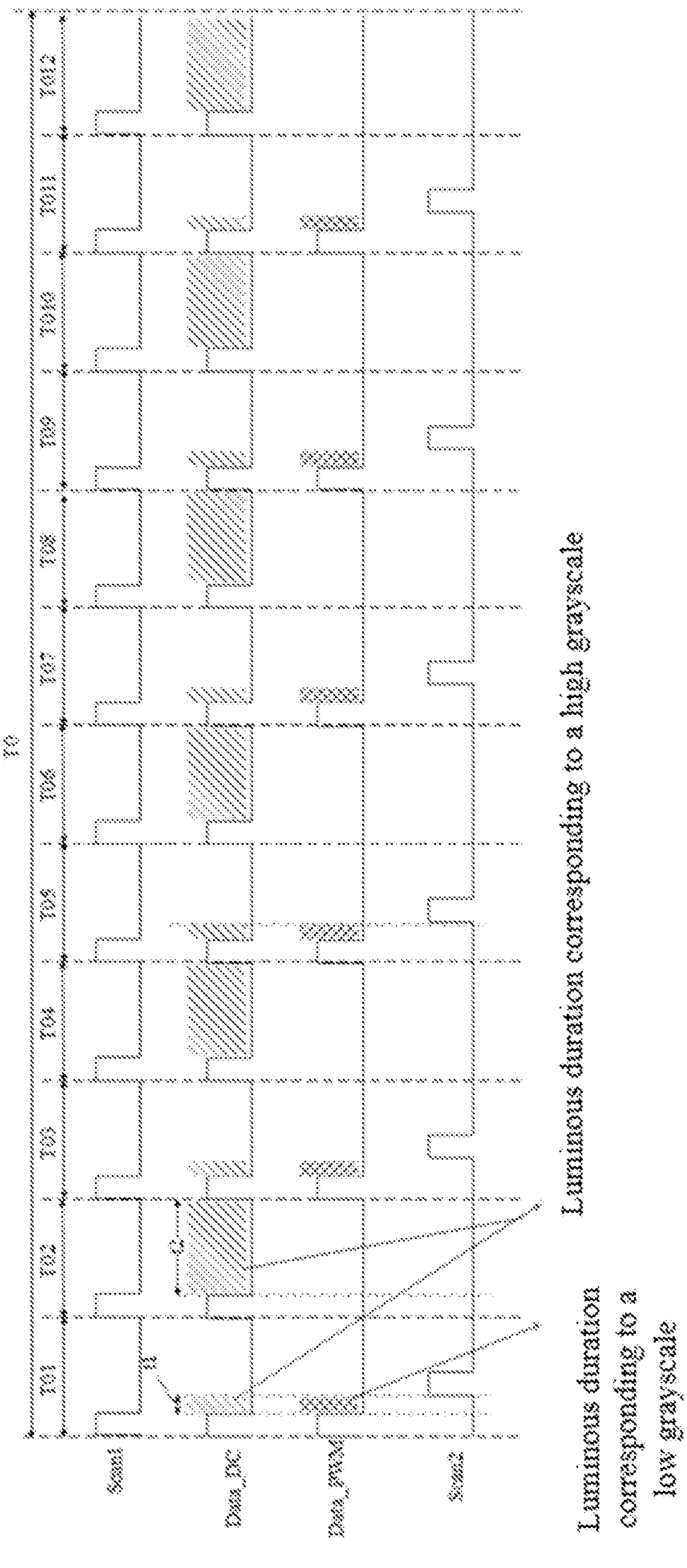
FIG. 2 is a schematic diagram of a driving timing of a driving method of a display panel in some embodiments of the present disclosure.

Referring to FIG. 2, the present disclosure provides driving methods of a display panel. The driving method is applied to the pixel driving circuits in the above-mentioned display panel to drive the light-emitting elements 100 to operate. Specifically, one frame of to-be-displayed image is divided into multiple subframes, and a period of each subframe is equal. The pulse width modulation mode is used for driving odd-numbered subframes, and the pulse amplitude modulation mode is used for driving even-numbered subframes. For example, on a condition that a frame rate is 120 Hz, each frame of to-be-displayed image TO is divided into 12 subframes, and the period of each subframe is 694 microseconds; a first subframe T01, a third subframe T03, a fifth subframe T05, a seventh subframe T07, a ninth subframe T09, and an eleventh subframe T011 are all driven by the pulse width modulation mode; and a second subframe T02, a fourth subframe T04, a sixth subframe T06, an eighth subframe T08, a tenth subframe T010, and a twelfth subframe T012 are all driven by the pulse amplitude modulation mode.

For the odd-numbered subframes driven by the pulse width modulation mode, for example, for the first subframe driven by the pulse width modulation mode, when the scanning signal Scan1 is high level, the data writing transistor 210 turns on and writes a pulse width modulation signal Data-PWM into the driving transistor 220, and then the light-emitting element 100 lights up after the pulse width modulation signal Data-PWM is written; at this time, the luminous duration corresponding to the high grayscale in the first subframe is t1, and the luminous duration corresponding to the low grayscale in the first subframe is also t1. Then, after the reset transistor 230 turns on when the scanning signal Scan2 is high level, the control terminal Q of the driving transistor 220 is reset, the driving transistor 220 turns off, and then the light-emitting element 100 stops lighting. And then, when the scanning signal Scan1 is high level again, it switches to the second subframe driven by the pulse amplitude modulation mode, the data writing transistor 210 turns on again in response to the scanning signal Scan1 to write a pulse amplitude modulation signal Data-DC into the driving transistor 220, and then the light-emitting element 100 lights up after the pulse amplitude modulation signal Data-DC is written. That is, the luminous duration corresponding to the high grayscale in the second subframe is t2.

Figure 3:
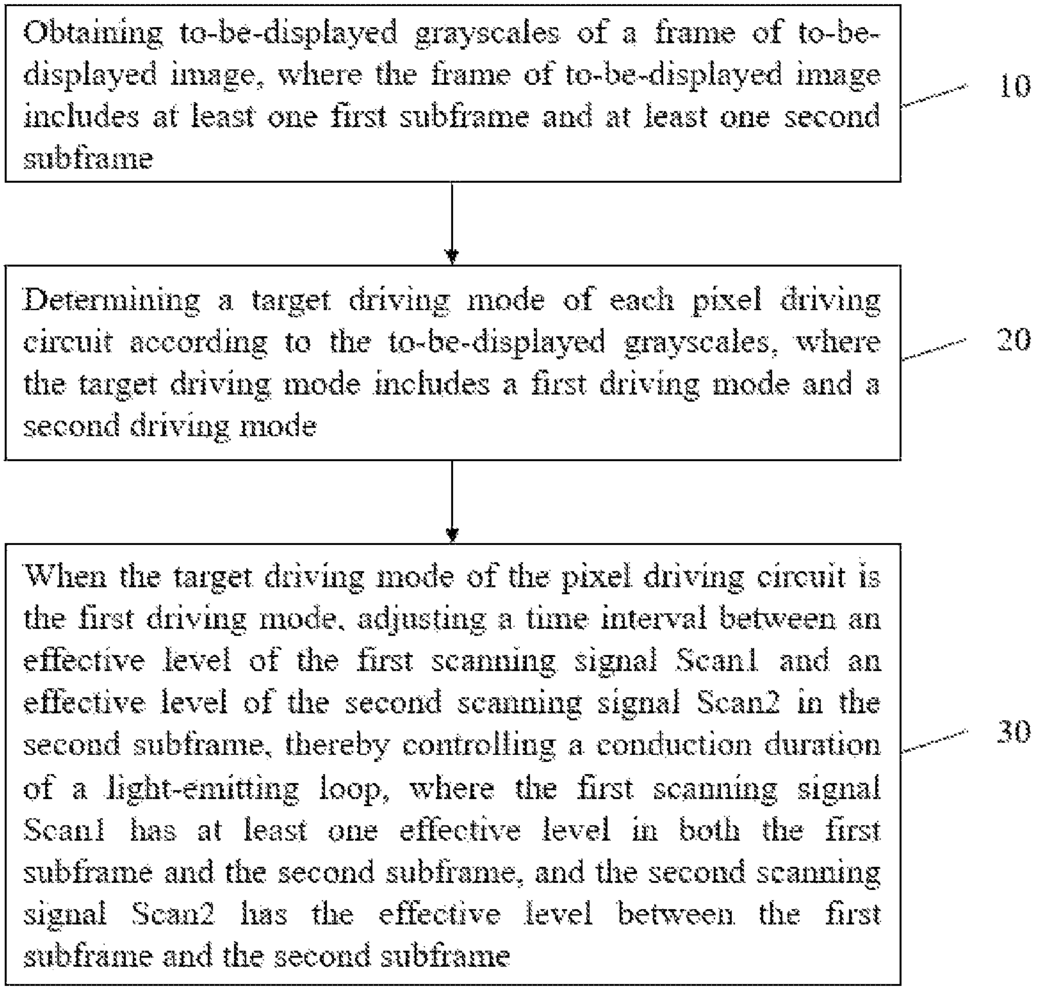
FIG. 3 is a flow chart of a driving method of a display panel in response to embodiments of the present disclosure.
Figure 4:
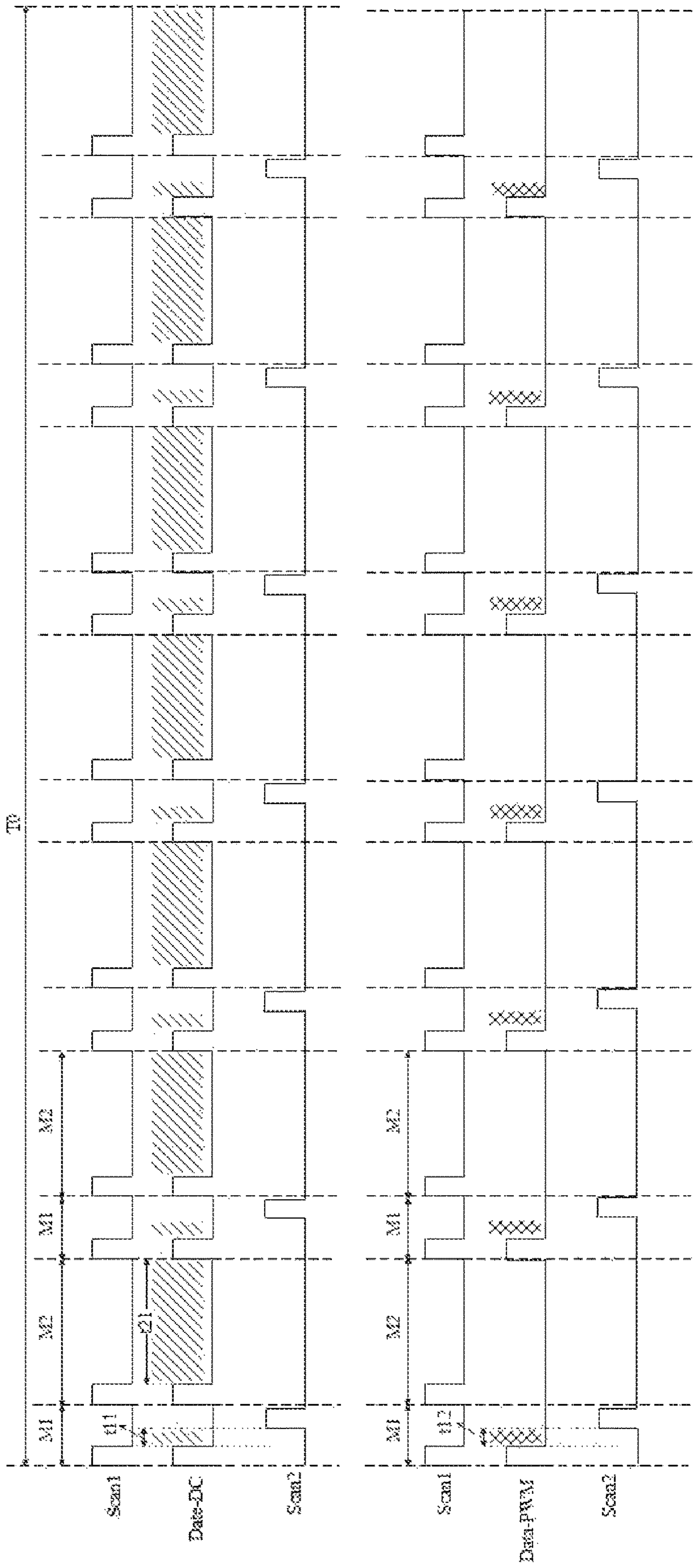
FIG. 4 is a schematic diagram of another driving timing of a driving method of a display panel in some embodiments of the present disclosure.

Referring to FIG. 3 and FIG. 4, embodiments of the present disclosure also provide another driving methods of a display panel. This driving method is applied to the pixel driving circuit in the above-mentioned display panel to drive the light-emitting element 100 to operate. The driving method includes steps of 10, 20, and 30.

The step 10 includes: obtaining to-be-displayed grayscales of a frame of to-be-displayed image, where the frame of to-be-displayed image includes at least one first subframe and at least one second subframe.

The to-be-displayed image in the present disclosure is one of the multiple frames of to-be-displayed images displayed on the display panel. The frame of to-be-displayed image TO is divided into at least one first subframe M1 and at least one second subframe M2. The second subframe M2 is a next displaying subframe after the first subframe M1 is displayed, that is, the first subframe M1 and the second subframe M2 are continuously displayed. The to-be-displayed grayscale refers to a grayscale corresponding to luminous intensity of the light-emitting element 100. The display panel includes a plurality of light-emitting elements 100, so the to-be-displayed grayscales of the frame of to-be-displayed image include a plurality of different grayscales, and each light-emitting element 100 is configured to display a corresponding one of the grayscales in the frame of to-be-displayed image.

In some embodiments, a number of first subframes M1 and a number of second subframes M2 are the same. That is, when there are two first subframes M1, there are correspondingly two second subframes M2; when there are three first subframes M1, there are correspondingly three second subframes M2. The first subframes M1 and the second subframes M2 are alternately arranged in one frame. That is, after the first subframe M1 is displayed, the second subframe M2 displays, and after the second subframe M2 is displayed, the next subframe M2 displays. It can be understood that, taking one first subframe M1 and one second subframe M2 as a group, thus one frame may be divided into one or more groups, and then each group is divided into the first subframe M1 and the second subframe M2. For example, for the 120 Hz frame rate, the frame may be divided into six groups, and then each group may be divided into the first subframe M1 and the second subframe M2, thereby obtaining 12 subframes. A sum of the periods of the first subframe M1 and the second subframe M2 may be 1388 microseconds, and the periods of the first subframe M1 and the second subframe M2 may be equal or unequal.

The step 20 includes: determining a target driving mode of each pixel driving circuit according to the to-be-displayed grayscales, where the target driving mode includes a first driving mode and a second driving mode.

After the to-be-displayed grayscales of the frame of the to-be-displayed image are obtained, the target driving mode of the pixel driving circuit under the corresponding to-be-displayed grayscale is determined according to the to-be-displayed grayscale. The target driving mode includes the first driving mode and the second driving mode. Correspondingly, the to-be-displayed grayscale is defined as a relative high grayscale or a relative low grayscale, and the high grayscale corresponds to one of the first driving mode and the second driving mode, and the low grayscale correspond to the other one of the first driving mode and the second driving mode. Specifically, when the to-be-displayed grayscale is greater than a grayscale threshold, that is, the to-be-displayed grayscale is the high grayscale, then the first driving mode is used as the target driving mode; and when the to-be-displayed grayscale is less than the grayscale threshold, the to-be-displayed grayscale is the low grayscale, then the second driving mode is used as the target driving mode. This enables different driving modes to be used for different grayscales to drive the light-emitting element 100 to display.

In the embodiments, different driving modes indicate different data signals of the corresponding pixel driving circuit. Specifically, the first driving mode is the pulse amplitude modulation driving mode, which adjusts the luminous intensity of the light-emitting element 100 by adjusting a pulse amplitude of the pixel driving circuit. In the first driving mode, the data signal provided by the data line connected to the corresponding pixel driving circuit is the pulse amplitude modulation signal Data-DC. The second driving mode is a pulse width modulation driving mode, which adjusts the luminous intensity of the light-emitting element 100 by adjusting a pulse width of the pixel driving circuit. In the second driving mode, the data signal provided by the data line connected to the corresponding pixel driving circuit is the pulse width modulation signal Data-PWM.

In the embodiments, when the to-be-displayed grayscale is the high grayscale, the pulse amplitude modulation mode is used to drive the light-emitting element 100 to work; and when the to-be-displayed grayscale is the low grayscale, the pulse width modulation mode is used to drive the light-emitting element 100 to work.

The step 30 includes: when the target driving mode of the pixel driving circuit is the first driving mode, adjusting a time interval between an effective level of the first scanning signal Scan1 and an effective level of the second scanning signal Scan2 in the second subframe, thereby controlling a conduction duration of a light-emitting loop, where the first scanning signal Scan1 has at least one effective level in both the first subframe and the second subframe, and the second scanning signal Scan2 has the effective level between the first subframe and the second subframe.

In the present disclosure, when the target driving mode of the pixel driving circuit is the pulse amplitude modulation driving mode, the time interval between the effective level of the first scanning signal Scan1 and the effective level of the second scanning signal Scan2 in the second subframe M2 may be adjusted. When the first scanning signal Scan1 has the effective level, the corresponding pulse amplitude modulation signal also has an effective level. That is to say, when the first scanning signal Scan1 controls the data writing transistor 210 to turn on, the corresponding data signal may be written through the data writing transistor 210. It can be understood that when the second scanning signal Scan2 is the effective level, the reset transistor 230 turns on, and the reset signal may turn off the driving transistor 220 to turn off the light-emitting loop, and then the light-emitting element 100 stops lighting. When the effective level of the first scanning signal Scan1 appears at a certain time interval after the effective level of the second scanning signal Scan2, the writing of the corresponding pulse amplitude modulation signal may turn on the driving transistor 220, then the light-emitting loop may be turned on, and then the light-emitting element 100 lights up. The shorter the time interval is, the earlier the light-emitting element 100 lights up, and the longer the luminous duration of the light-emitting element 100 correspondingly driven by the pulse amplitude modulation driving mode, i.e. corresponding to high grayscale, so that the luminous duration (t21 in FIG. 4) corresponding to the high grayscale is increased, thereby increasing the brightness of the light-emitting element 100.

That is to say, when the target driving mode in the present disclosure is the pulse amplitude modulation driving mode, by adjusting the time interval between the effective level of the first scanning signal Scan1 and the effective level of the second scanning signal Scan2 in the second subframe M2, it is possible to effectively control the luminous duration of the light-emitting element 100, thereby controlling the display brightness of the light-emitting element 100. In this process, there is no need to increase a size of the driving transistor. That is to say, in the present disclosure, the display brightness may be adjusted without increasing a design difficulty of the display panel.

In an embodiment, the time interval between the effective level of the first scanning signal Scan1 and the effective level of the second scanning signal Scan2 in the second subframe M2 is less than a first preset value to ensure the luminous duration of the light-emitting element 100. On a condition that the time interval between the effective level of the first scanning signal Scan1 and the effective level of the second scanning signal Scan2 in the second subframe M2 is zero, the pulse amplitude modulation signal is immediately written after the effective level of the second scanning signal Scan2 appears, thus to control the luminous duration of the light-emitting element 100 to be longest, thereby displaying the maximum brightness. At this time, the second scanning signal Scan2 may be regarded as a switching signal configured to switch the first subframe M1 and the second subframe M2. When the effective level of the second scanning signal Scan2 comes after the first subframe M1, it switches to the second subframe M2, the corresponding pulse amplitude modulation driving signal is written to drive the light-emitting element 100 to light up, thereby completing the display of high grayscale/brightness.

In some embodiments, the effective level of the first scanning signal Scan1 is high level, and the effective level of the second scanning signal Scan2 is high level. An interval between a falling edge of the second scanning signal Scan2 and a rising edge of the subsequent first scanning signal Scan1 is the time interval between the effective level of the first scanning signal Scan1 and the effective level of the second scanning signal Scan2 in the second subframe M2. On a condition that the time interval is zero, the first scanning signal Scan1 comes after the corresponding falling edge of the second scanning signal Scan2, thereby ensuring the longest luminous duration of the light-emitting element 100.

In some embodiments, when the target driving mode of the pixel driving circuit is the second driving mode, and when a time interval between the effective level of the first scanning signal Scan1 and the effective level of the second scanning signal Scan2 in the first subframe M1 is greater than a second preset value, the pulse width of the pixel driving circuit is adjusted to adjust the luminous intensity of the light-emitting element 100. The second driving mode corresponds to the to-be-displayed grayscale being the low grayscale. It can be understood that, for the grayscale in the first subframe M1, when the effective level of the first scanning signal Scan1 comes, the data writing transistor 210 turns on to write the pulse width modulation signal into the driving transistor 220, so that the driving transistor 220 turns on to control the light-emitting element 100 to light up until the effective level of the second scanning signal Scan2 comes, which controls the reset transistor 230 to turn on, thus the driving transistor 220 turns off to control the light-emitting element 100 to stop lighting. That is to say, the longer the time interval between the occurrence of the effective level of the first scanning signal Scan1 and the occurrence of the effective level of the second scanning signal Scan2 is, the longer the luminous duration of the light-emitting element 100 may be. The longer the luminous duration of the light-emitting element 100 is, the greater the corresponding brightness may be. To achieve the display of low grayscale/brightness, it is necessary to reduce the pulse width of the pulse width modulation signal to reduce the voltage value written by the pulse width modulation signal, thereby reducing the driving current of the light-emitting element 100 to ensure the display of the grayscale/brightness. That is, when the time interval between the effective level of the first scanning signal Scan1 and the effective level of the second scanning signal Scan2 in the first subframe M1 is greater than the second preset value, the pulse width of the pixel driving circuit, i.e. of the pulse width modulation signal, is adjusted to adjust the luminous intensity of the light-emitting element 100, thereby achieving the display of the low grayscale/brightness.

In an embodiment, the effective level of the first scanning signal Scan1 is high level, and the effective level of the second scanning signal Scan2 is high level; an interval between the falling edge of the first scanning signal Scan1 and the rising edge of the following second scanning signal Scan2 is the time interval between the effective level of the first scanning signal Scan1 and the effective level of the second scanning signal Scan2 in the first subframe M1.

In the present disclosure, the pulse amplitude modulation driving mode is used for high grayscales. Specifically, in the first subframe M1, the first scanning signal Scan1 controls the data writing transistor 210 to turn on and write the pulse amplitude modulation signal into the driving transistor 220, and then the light-emitting element 100 lights up. The luminous duration corresponding to the high grayscale is t11 shown in FIG. 4, and the luminous duration corresponding to the low grayscale is t12 shown in FIG. 4. Then, when the second scanning signal Scan2 comes, the reset transistor 230 turns on to reset the control terminal of the driving transistor 220, and thus the light-emitting element 100 stops lighting. When the effective level of the first scanning signal Scan1 appears immediately after the effective level of the second scanning signal Scan2, it switches to the second subframe M2 from the first subframe M1, and the time interval between the effective level of the first scanning signal Scan1 and the effective level of the second scanning signal Scan2 in the second subframe M2 is zero; the first scanning signal Scan1 controls the data writing transistor 210 to turn on and write the pulse amplitude modulation driving signal into the driving transistor 220 again, thus the light-emitting element 100 lights up again. When a switching time between the first subframe M1 and the second subframe M2 is ignored, that is, the pulse width of the first scanning signal Scan1 and the pulse width of the second scanning signal Scan2 are ignored, the light-emitting element 100 under the high grayscale lights up in a period of the entire first sub-frame M1 and the entire second sub-frame M2, so that the luminous duration corresponding to the high grayscale is 100% and a corresponding current duty cycle is 100%, thereby effectively increasing the luminous duration corresponding to the high grayscale, which improves the display brightness.

In the present disclosure, the pulse width modulation driving mode is used for low grayscales. Specifically, in the first subframe M1, the first scanning signal Scan1 controls the data writing transistor 210 to turn on and write the pulse width modulation signal to the driving transistor 220, and then the light-emitting element 100 lights up. Then, when the second scanning signal Scan2 comes, the reset transistor 230 turns on to reset the control terminal of the driving transistor 220, and the light-emitting element 100 stops lighting. When the effective level of the first scanning signal Scan1 appears after the effective level of the second scanning signal Scan2, the pulse width modulation signal no longer writes an effective signal, and the corresponding light-emitting element 100 does not light up. That is to say, in the present disclosure, the light-emitting element 100 is only controlled to light up during the first subframe M1 to meet the display of the low grayscale/brightness.

Compared with a conventional 3T1C pixel driving circuit, under the same current condition, the brightness of the light-emitting element driven by a 4T1C pixel driving circuit may decrease. In order to increase the display brightness, a size of the driving transistor needs to be increased in related art, which increases the design difficulty of display panel. In the present disclosure, when the target driving mode of the pixel driving circuit is the pulse amplitude modulation driving mode, by adjusting the time interval between the effective level of the first scanning signal and the effective level of the second scanning signal in the second subframe, the luminous duration of the light-emitting element is adjusted, and then the luminous intensity of the light-emitting element is controlled, so as to improve the display brightness. In this process, there is no need to increase the size of the driving transistor, which means that the display brightness may also be improved in the present disclosure without increasing the design difficulty of the display panel.

It should be noted that in the present disclosure, the second scanning signal is configured to turn on the reset transistor to reset the control terminal of the driving transistor. After the control terminal of the driving transistor is reset and turned off, the data signal is written into the control terminal of the driving transistor in response to the first scanning signal, and the data signal may be the pulse amplitude modulation signal or the pulse width modulation signal. Different data signals correspond to different driving modes. That is to say, in the present disclosure, the reset signal is configured to achieve the switch between different driving modes, so that the pixel driving circuit may be driven by the pulse width modulation mode, or the pulse amplitude modulation mode, or a mixture of the two driving modes. For example, when the to-be-displayed grayscales require all high grayscales/brightness, the pulse amplitude modulation mode is used to drive; when the to-be-displayed grayscales require all low grayscales/brightness, the pulse width modulation mode is used to drive; and when the to-be-displayed grayscales require inconsistent brightness, the pulse hybrid modulation mode is used to drive, thereby increasing driving flexibility.

In the above embodiments, each embodiment is described with its own emphasis. For parts that are not described in detail in a certain embodiment, please refer to the relevant descriptions of other embodiments.

The above is a detailed introduction to the driving methods of the display panel provided by the embodiments of the present disclosure. Specific examples are used in this paper to illustrate the principles and implementation methods of the present disclosure. The description of the above embodiments is only used to help understand the technical solutions and core ideas of the present disclosure. Those of ordinary skill in the art should understand: it is still possible to modify the technical solutions recorded in the foregoing embodiments, or to equivalently replace some of the technical features, however, these modifications or substitutions do not cause the essence of the corresponding technical solutions to depart from the scope of the technical solutions of the embodiments of the present disclosure.

What is claimed is:

1. A display panel, comprising a plurality of pixel driving circuits, and each of the pixel driving circuits comprising:

a light-emitting element, connected between a first power supply line and a second power supply line to form a light-emitting loop;

a driving transistor, configured to control a driving current flowing through the light-emitting element, and comprising:

a gate; and a source and a drain, connected in series in the light-emitting loop;

a data writing transistor, configured to write a data signal provided by a data line into the gate of the driving transistor in response to a first scanning signal provided by a first scanning line to turn on the light-emitting loop, and data writing transistor comprising:

a gate, connected to the first scanning line;

a first electrode, connected to the data line; and a second electrode, connected to the gate of the driving transistor; and a reset transistor, configured to reset a potential of the gate of the driving transistor in response to a second scanning signal provided by a second scanning line and a reset voltage provided by a voltage line to turn off the light-emitting loop, and the reset transistor comprising:

a gate, connected to a second scanning line;

a first electrode, connected to the voltage line; and a second electrode, connected to the gate of the driving transistor.

2. The display panel according to claim 1, wherein each of the pixel driving circuits further comprises:

a storage capacitor, connected between the gate of the driving transistor and the first electrode of the driving transistor, and configured to store the data signal and the second scanning signal.

3. A driving method of a display panel, the display panel comprising a plurality of pixel driving circuits, and each of the pixel driving circuits comprising:

a light-emitting element, connected between a first power supply line and a second power supply line to form a light-emitting loop;

a driving transistor, configured to control a driving current flowing through the light-emitting element, and comprising:

a gate; and a source and a drain, connected in series in the light-emitting loop;

a data writing transistor, configured to write a data signal provided by a data line into the gate of the driving transistor in response to a first scanning signal provided by a first scanning line to turn on the light-emitting loop, and data writing transistor comprising:

a gate, connected to the first scanning line;

a first electrode, connected to the data line; and a second electrode, connected to the gate of the driving transistor; and a reset transistor, configured to reset a potential of the gate of the driving transistor in response to a second scanning signal provided by a second scanning line and a reset voltage provided by a voltage line to turn off the light-emitting loop, and the reset transistor comprising:

a gate, connected to a second scanning line;

a first electrode, connected to the voltage line; and a second electrode, connected to the gate of the driving transistor;

wherein the driving method comprises:

obtaining to-be-displayed grayscales of a frame of to-be-displayed image, wherein the frame of to-be-displayed image comprises at least one first subframe and at least one second subframe;

determining a target driving mode of each of the pixel driving circuits according to the to-be-displayed grayscales, wherein the target driving mode comprises a first driving mode and a second driving mode; and when the target driving mode is the first driving mode, adjusting a time interval between an effective level of the first scanning signal and an effective level of the second scanning signal in the second subframe, so as to control a conduction duration of the light-emitting loop, wherein the first scanning signal comprises at least one effective level in both the first subframe and the second subframe, and the second scanning signal comprises the effective level between the first subframe and the second subframe.

4. The driving method of the display panel according to claim 3, wherein the time interval between the effective level of the first scanning signal and the effective level of the second scanning signal in the second subframe is less than a first preset value.

5. The driving method of the display panel according to claim 3, wherein the frame of to-be-displayed image comprises the same number of the first subframe and the second subframe.

6. The driving method of the display panel according to claim 4, wherein the effective level of the first scanning signal is high level, the effective level of the second scanning signal is high level; and an interval between a falling edge of the second scanning signal and a rising edge of the subsequent first scanning signal is the time interval between the effective level of the first scanning signal and the effective level of the second scanning signal in the second subframe.

7. The driving method of the display panel according to claim 6, wherein the first driving mode is a pulse amplitude modulation driving mode, which adjusts a luminous intensity of the light-emitting element by adjusting a pulse amplitude of each of the pixel driving circuits.

8. The driving method of the display panel according to claim 6, wherein the second driving mode is a pulse width modulation driving mode, which adjusts a luminous intensity of the light-emitting element by adjusting a pulse width of each of the pixel driving circuits.

9. The driving method of the display panel according to claim 8, wherein when the target driving mode is the second driving mode, and when a time interval between an effective level of the first scanning signal and an effective level of the second scanning signal in the first subframe is greater than a second preset value, the pulse width is adjusted to adjust the luminous intensity of the light-emitting element.

10. The driving method of the display panel according to claim 8, wherein the effective level of the first scanning signal is high level, the effective level of the second scanning signal is high level; and an interval between a falling edge of the first scanning signal and a rising edge of the subsequent second scanning signal is the time interval between the effective level of the first scanning signal and the effective level of the second scanning signal in the first subframe.

11. The driving method of the display panel according to claim 3, wherein a step of determining the target driving mode of each of the pixel driving circuits according to the to-be-displayed grayscales comprises:

determining the first driving mode as the target driving mode when a corresponding one of the to-be-displayed grayscales is greater than a grayscale threshold, and determining the second driving mode as the target driving mode when the corresponding one of the to-be-displayed grayscales is less than a grayscale threshold.

12. A driving method of a display panel, the display panel comprising a plurality of pixel driving circuits, and each of the pixel driving circuits comprising:

a light-emitting element, connected between a first power supply line and a second power supply line to form a light-emitting loop;

a driving transistor, configured to control a driving current flowing through the light-emitting element, and comprising:

a gate; and a source and a drain, connected in series in the light-emitting loop;

a data writing transistor, configured to write a data signal provided by a data line into the gate of the driving transistor in response to a first scanning signal provided by a first scanning line to turn on the light-emitting loop, and data writing transistor comprising:

a gate, connected to the first scanning line;

a first electrode, connected to the data line; and a second electrode, connected to the gate of the driving transistor; and a reset transistor, configured to reset a potential of the gate of the driving transistor in response to a second scanning signal provided by a second scanning line and a reset voltage provided by a voltage line to turn off the light-emitting loop, and the reset transistor comprising:

a gate, connected to a second scanning line;

a first electrode, connected to the voltage line; and a second electrode, connected to the gate of the driving transistor;

wherein the driving method comprises:

dividing the frame of to-be-displayed image into a plurality of subframes, wherein a period of each of the subframes is equal;

driving odd-numbered subframes of the plurality of subframes by a pulse width modulation mode; and driving even-numbered subframes of the plurality of subframes by a pulse amplitude modulation mode.

* * * * *